United States Patent
Zhu et al.

(10) Patent No.: US 8,964,415 B2
(45) Date of Patent: Feb. 24, 2015

(54) CIRCUITS AND METHODS FOR INCREASING POWER FACTOR OF SWITCH MODE POWER SUPPLY

(75) Inventors: Yajiang Zhu, Shanghai (CN); Na Liu, Shanghai (CN); Siyuan Xu, Shanghai (CN)

(73) Assignee: BCD Semiconductor Manufacturing Limited, George town (KY)

( * ) Notice: Subject to any disclaimer, the term of this patent is extended or adjusted under 35 U.S.C. 154(b) by 234 days.

(21) Appl. No.: 13/610,790

(22) Filed: Sep. 11, 2012

(65) Prior Publication Data

US 2013/0343095 A1    Dec. 26, 2013

(30) Foreign Application Priority Data

Jun. 26, 2012  (CN) .......................... 2012 1 0214383

(51) Int. Cl.
    *H02M 3/335*  (2006.01)
(52) U.S. Cl.
    USPC ........................ 363/20; 363/21.09; 363/21.1
(58) Field of Classification Search
    USPC ........ 363/15, 21.01, 20, 17, 18, 21.04, 21.05, 363/21.06, 21.07, 21.09, 21.1, 21.11, 21.12, 363/21.13, 21.14, 21.15, 21.16, 21.17, 363/21.18
    See application file for complete search history.

(56) References Cited

U.S. PATENT DOCUMENTS

| | | | | |
|---|---|---|---|---|
| 5,751,115 A * | 5/1998 | Jayaraman et al. | ........... | 315/225 |
| 5,856,917 A * | 1/1999 | Aonuma et al. | ........... | 363/21.04 |
| 6,480,401 B2 * | 11/2002 | Tang | ........... | 363/21.02 |
| 6,493,243 B1 * | 12/2002 | Real | ........... | 363/17 |
| 6,958,920 B2 * | 10/2005 | Mednik et al. | ........... | 363/19 |
| 7,279,868 B2 * | 10/2007 | Lanni | ........... | 323/222 |
| 7,414,864 B2 * | 8/2008 | Hosotani et al. | ........... | 363/21.16 |
| 7,436,685 B2 * | 10/2008 | Li et al. | ........... | 363/21.01 |
| 7,558,081 B2 * | 7/2009 | Green et al. | ........... | 363/21.03 |
| 7,738,266 B2 * | 6/2010 | Jacques et al. | ........... | 363/21.02 |
| 7,936,157 B2 * | 5/2011 | Kashima | ........... | 323/282 |
| 7,965,523 B2 * | 6/2011 | Yamaguchi et al. | ........... | 363/21.12 |
| 8,045,348 B2 * | 10/2011 | Zhu et al. | ........... | 363/49 |
| 8,482,943 B2 * | 7/2013 | Duan et al. | ........... | 363/40 |
| 8,587,968 B2 * | 11/2013 | Zhu et al. | ........... | 363/21.12 |

(Continued)

FOREIGN PATENT DOCUMENTS

CN         102064686 A        5/2011

OTHER PUBLICATIONS

China Intellectual Property Office office action patent application CN201210214383.3(Feb. 8, 2014).

*Primary Examiner* — Adolf Berhane
*Assistant Examiner* — Nusrat Quddus

(57) ABSTRACT

A switching mode power supply (SMPS) includes a rectifying device configured for converting a periodically varying input AC (alternating current) voltage into a DC (direct current) voltage, and a transformer including a primary winding, a secondary winding, and an auxiliary winding. The primary winding is coupled to the rectifying device. An input capacitor is coupled to the rectifying device and the primary winding of the transformer. A first power switch is coupled to the input capacitor. A control circuit is coupled to the first power switch and is configured to control the first power switch based on a phase or amplitude of the input AC voltage. By controlling the charging and discharging of the input capacitor, power is provided to the primary winding during a longer portion of the AC input voltage cycle, allowing the rectifier device to have a larger conduction angle to increase a power factor (PF).

20 Claims, 8 Drawing Sheets

(56) References Cited

U.S. PATENT DOCUMENTS

| | | | |
|---|---|---|---|
| 2009/0279333 A1* | 11/2009 | Zhu et al. | 363/124 |
| 2011/0261596 A1* | 10/2011 | Zong et al. | 363/21.13 |
| 2012/0056548 A1* | 3/2012 | Duan et al. | 315/200 R |
| 2012/0056551 A1* | 3/2012 | Zhu et al. | 315/232 |

* cited by examiner

CIRCUITS AND METHODS FOR INCREASING POWER FACTOR OF SWITCH MODE POWER SUPPLY

CROSS-REFERENCES TO RELATED APPLICATIONS

This application claims priority to Chinese Patent Application No. 201210214383.3, filed Jun. 26, 2012, commonly owned and incorporated by reference in its entirety herein.

BACKGROUND OF THE INVENTION

The present invention is directed to switching mode power supplies (SMPS). More particularly, embodiments of the invention provide circuits and methods for improving the power factor of the SMPS. But it would be recognized that the invention has a much broader range of applicability.

Switching mode power supplies (SMPS) have the advantages of smaller size, higher efficiency and larger output power capability, and are widely applied in mobile phone chargers, notebook computer adapters and other fields. With the development of light-emitting diode (LED) technology as a replacement for incandescent white light bulb, SMPS is widely used as drivers for providing power to LEDs.

With the development of electronic technology, more and more electronic devices adopt LCD as display. As a kind of backlight source, light-emitting diode (LED) has many advantages, such as long lifetime, high efficiency, and no toxic material. As a result, LEDs are becoming increasingly popular as a backlight source.

As described further below, conventional LED backlight drivers have many limitations. These limitations include, for example, lack of LED current matching, inconsistency of LED brightness, and costly manufacturing process, etc.

In view of the foregoing, there is a need for improved techniques for achieving zero watts of standby energy consumption switch mode power supplies.

BRIEF SUMMARY OF THE INVENTION

As described further below, conventional power supplies often cannot provide desired power factor, resulting in loss of power efficiency. In accordance with embodiments of the present invention, techniques are described for improving the power factor of the SMPS. According to an embodiment of the invention, a switching mode power supply (SMPS) includes a rectifying device configured for converting a periodically varying input AC (alternating current) voltage into a DC (direct current) voltage, and a transformer including a primary winding, a secondary winding, and an auxiliary winding. The primary winding is coupled to the rectifying device. An input capacitor having a first terminal coupled to the rectifying device and the primary winding of the transformer. A first power switch coupled to a second terminal of the input capacitor and a primary side ground. The SMPS also includes a control circuit coupled to the first power switch and the input AC source, the control circuit being configured to control the first power switch based on a phase or amplitude of the input AC voltage. The control circuit is configured to:

turn on the first power switch when the AC input voltage is near a zero crossing of its waveform to cause the input capacitor to discharge to the primary winding; and
 turn off the first power switch to prevent the input capacitor from discharging when the input AC voltage is near a peak or a valley of its waveform, whereby power is provided to the primary winding during a longer portion of the AC input voltage cycle, allowing the rectifier device to have a larger conduction angle to increase a power factor (PF).

In some embodiments of the above SMPS, the control circuit is configured to:

turn on the first power switch when an absolute magnitude of the AC input voltage is less than a reference voltage to cause the input capacitor to discharge to the primary winding; and
 turn off the first switch when the absolute magnitude of the AC input voltage is greater than the reference voltage to prevent the input capacitor from discharging.

In some embodiments, the first power switch includes a diode coupled between the input capacitor and the primary side ground, whereby the diode is configured to provide a path for charging current. In some embodiments, the SMPS also includes first, second, and third resistors. The first and the second resistors are coupled in series between two terminals of the input AC voltage, the third resistor couples a common node between the first and second resistors to a primary side ground, and the common node is coupled to a first input terminal of the controller for determining the phase and amplitude of the input AC voltage.

In some embodiments, the SMPS also has a second capacitor between the output of the rectifying circuit and the primary ground for suppressing electromagnetic interference. The second capacitor is coupled to the input capacitor through a second diode that prevents the input capacitor from discharging into the second capacitor.

In some embodiments, the SMPS also includes a second power switch coupled between the primary winding and the controller, and the controller is configured to control the on and off of the second power switch to maintain the output of the SMPS at a constant voltage or a constant current.

According to an embodiment of the invention, a controller is provided for a switch mode power supply (SMPS) system. The SMPS system includes a rectifying device, configured for converting a periodically varying input AC voltage into a single polarity DC voltage, a transformer including a primary winding, a secondary winding, and an auxiliary winding, the primary winding being coupled to the rectifying device, and an input capacitor having a first terminal and a second terminal, the first terminal coupled to the rectifying device and the primary winding of the transformer. The controller includes a first power switch for coupling to the second terminal of the input capacitor and a ground of the controller, a detection circuit for coupling to the input AC voltage and the ground of the controller. The detection circuit is configured for determining an amplitude or a phase of the input AC voltage. The controller also includes a control circuit coupled to the first power switch and configured to turn on and turn off the first power switch based on the amplitude or phase of the input AC voltage.

In some embodiments of the above controller, the control circuit is configured to:

turn on the first power switch when the AC input voltage is near a zero crossing to cause the input capacitor to discharge to the primary winding; and
 turn off the first power switch to prevent the input capacitor from discharging when the input AC voltage is near a peak or a valley of its waveform, In some embodiments of the above controller, the control circuit is configured to:

turn on the first power switch when an absolute magnitude of the AC input voltage is less than a reference voltage to cause the input capacitor to discharge to the primary winding; and turn off the first power switch when the absolute magnitude of the AC input voltage is greater than the reference voltage to prevent the input capacitor from discharging.

In some embodiments of the above controller, the first power switch includes a PMOS transistor with a source coupled to the primary side ground and a drain coupled to the input capacitor. The PMOS transistor also includes a parasitic PN diode that provides a path for charging the input capacitor. The first power switch is configured to discharge the input capacitor when the voltage between the gate and source of the PMOS transistor is smaller than its threshold voltage, and the first power switch is configured to prevent discharging the input capacitor when the voltage between the gate and source of the PMOS transistor is greater than its threshold voltage. In some embodiments, the PMOS power switch and the control circuit reside in two separate packaged devices. In other embodiments, the PMOS power switch and the control circuit reside in a single packaged device. In some embodiments, the first power switch comprises a PNP transistor having an emitter coupled to ground, a collector coupled to the input capacitor, and a PN junction between the collector and emitter that provides a charging path.

In some embodiments of the above controller, the controller is configured to control the discharge of the input capacitor based on the phase or amplitude of the input AC current such that the input capacitor provides power to the primary winding near the zero crossing of the AC current to provide a constant current or constant voltage, wherein the controller is configured to prevent the input capacitor from discharging when the input AC current is near a peak or valley of its waveform to provide a large conduction angle in the rectifying circuit to improve the power factor.

In some embodiments, the controller also includes a second power switch coupled to the primary winding, and the control circuit is configured to control the on and off of the second power switch based on a feedback signal to maintain the output of the SMPS at a constant voltage or a constant current. In some embodiments, the second power switch includes a high-voltage bipolar transistor or a high-voltage metal-oxide-semiconductor field effect transistor (MOSFET), and the second power switch and the control circuit residing in two separate packaged devices. In other embodiments, the second power switch includes a high-voltage bipolar transistor or a high-voltage metal-oxide-semiconductor field effect transistor (MOSFET), and the second power switch and the control circuit residing in a single packaged device.

According to an alternative embodiments of the invention, a method is provided for increasing a power factor in a switch mode power supply (SMPS) system. The SMPS system includes a rectifying device, configured for converting a periodically varying input AC voltage into a single polarity DC voltage, a transformer including a primary winding, a secondary winding, and an auxiliary winding, the primary winding being coupled to the rectifying device, and an input capacitor having a first terminal and a second terminal, the first terminal coupled to the rectifying device and the primary winding of the transformer. The method includes coupling a first power switch between the second terminal of the input capacitor and a ground, determining an amplitude or a phase of the input AC voltage, and turning on or off the first power switch based on the amplitude or phase of the input AC voltage.

In some embodiments of the above method, turning on or off the first power switch includes:

turning on the first power switch when the AC input voltage is near a zero crossing to cause the input capacitor to discharge to the primary winding; and turning off the first power switch to prevent the input capacitor from discharging when the input AC voltage is near a peak or a valley of its waveform.

In some embodiments of the above method, turning on or off the first power switch includes:

turning on the first power switch when an absolute magnitude of the AC input voltage is less than a reference voltage to cause the input capacitor to discharge to the primary winding; and turning off the first switch when the absolute magnitude of the AC input voltage is greater than the reference voltage to prevent the input capacitor from discharging.

Various additional embodiments, features, and advantages of the present invention can be appreciated with reference to the detailed description and accompanying drawings that follow.

DETAILED DESCRIPTION OF THE INVENTION

According to embodiments of the invention, in order to lower the production cost of LED lamps and broaden their applications, it is desirable for the LED lamps to produce the same brightness under different AC power supplies. To satisfy such requirements, the SMPS driver needs provide constant output current, and it is also desirable for the SMPS not to produce low frequency ripple signals lower than, for example, 165 Hz. The performance of an SMPS driver can be measured in terms of power factor (PF). The power factor of an AC electrical power system is defined as the ratio of the real power (P) flowing to the load to the apparent power (S) in the circuit, as defined in equation (1), $$PF = \frac{P}{S} = \frac{V_1 \times I_1 \times \cos\varphi}{V_1 \times I_{rms}} = \frac{I_1}{I_{rms}} \times \cos\varphi = \gamma \times \cos\varphi \quad (1)$$

where $I_1$ is the fundamental waveform of the AC input current, Irms is the total AC input current, the ratio $\gamma=I_1/\text{Irms}$ is the distortion factor of the input AC current, and $\cos \phi$ is the phase shift factor between the voltage and current of the fundamental waveform. As can be seen from equation (1), the power factor is determined by phase shift $\phi$ and distortion factor $\gamma$.

As described below, conventional power supplies often fail to provide a desirable power factor. Embodiments of the present invention provide methods for increasing the power factor in a power supply system. In some embodiments, the higher harmonics are suppressed by making the input current Iac conform to a sinusoidal waveform of the fundamental waveform $I_1$ with zero harmonics. Under this condition, $\gamma=I_1/\text{Irms}$ approaches 1, where Irms is the average of the total input current. In some other embodiments, the input voltage and input current are arranged to be substantially in phase, i.e., cos $\gamma$ is approximately 1, where $\phi$ is the phase angle.

Figure 1:
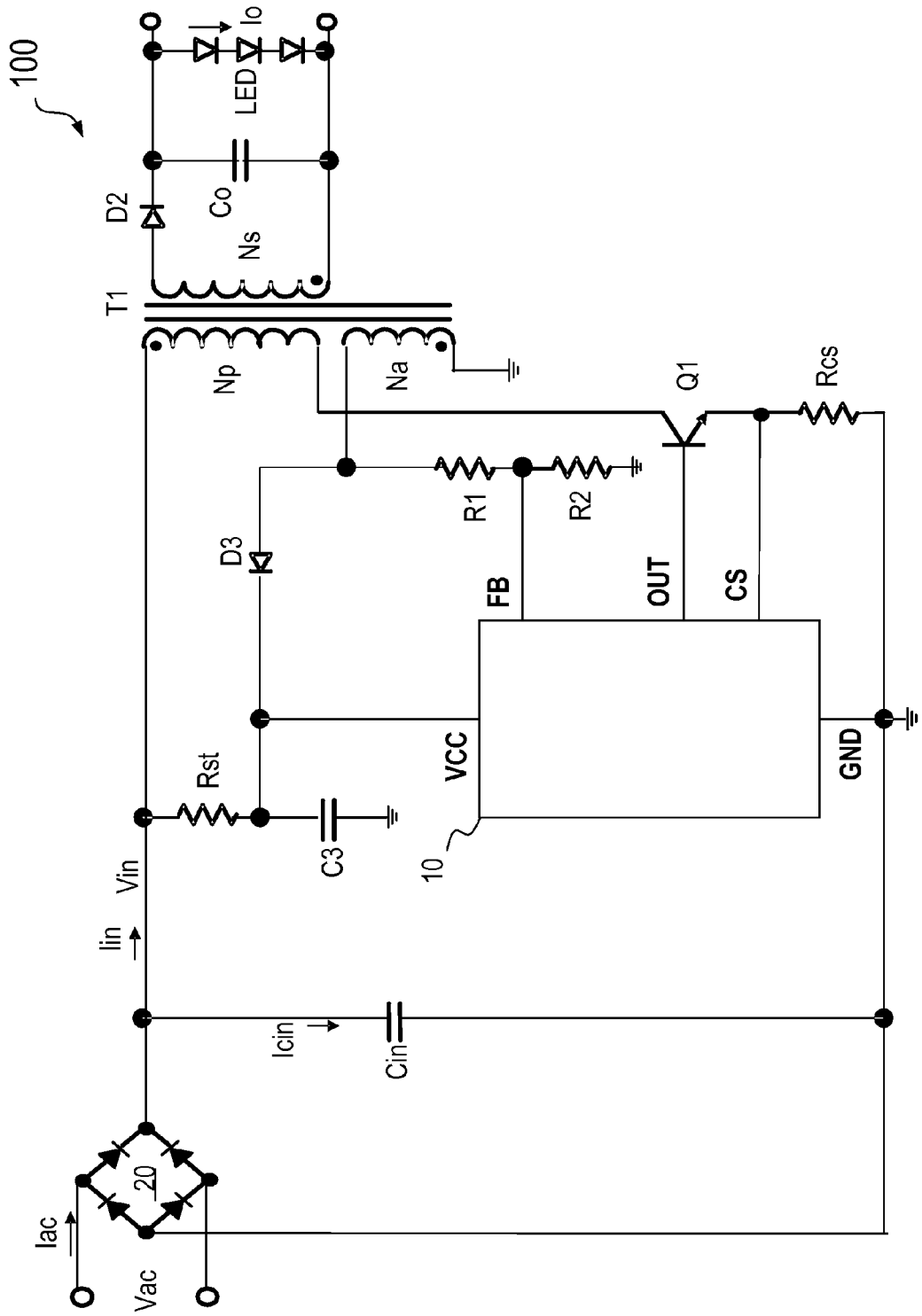
FIG. 1 is a schematic diagram illustrating an LED driver including a conventional SMPS.
Figure 2:
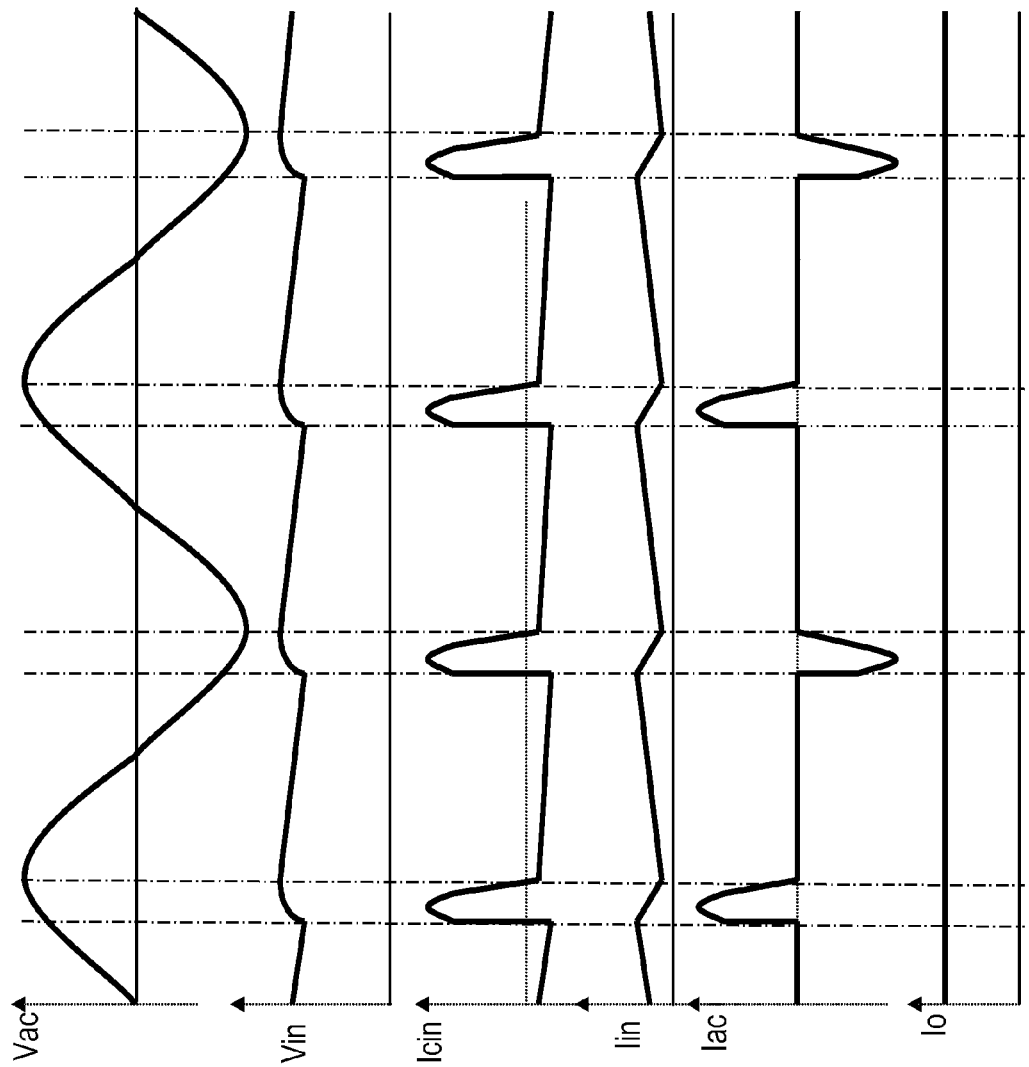
FIG. 2 is a waveform diagram illustrating various signals in the system of FIG. 1.

FIG. 1 is a schematic diagram illustrating an LED driver 100 including a conventional SMPS. FIG. 2 is a waveform diagram illustrating various signals in the system of FIG. 1. Description of LED driver system 100 is provided below with reference to the signals shown in FIG. 2. Input AC voltage Vac passes through rectifier bridge 20 and charges input capacitor Cin, producing a rectified DC (direct current) input voltage Vin. In order to suppress the 100 Hz or 120 Hz low frequency ripples, input capacitor Cin usually has a large capacitance such that at the zero crossing of the input AC voltage Vac, the output voltage of rectifier circuit 20 has enough magnitude to provide sufficient power through the transformer to the system output load. In FIG. 1, Rst is a startup resistor. When the system is turned on, voltage Vin charges capacitor C3 through Rst to provide power to terminal Vcc of controller 10 to allow controller 10 to start working. After startup, the auxiliary winding provides power to controller 10 through diode D3. Controller 10 is configured to maintain a constant average output current Io. More specifically, controller 10 senses the status of secondary-side rectifying diode D2 through voltage divider R1 and R2 to control the conduction of power switch Q1. Moreover, controller 10 also uses primary side current sense resistor Rcs to control the shut off of power switch Q1.

In FIG. 1, input capacitor Cin, for example, of 4.7 uF, is used to eliminate the 100 Hz or 120 Hz ripple waveform. Since the rectifier circuit includes a non-linear rectifying diode, such a capacitor tends to limit the conduction angle of the rectifying device to less than 180 degrees, resulting in substantial harmonic components, as shown below in FIG. 2. Since the harmonics do not contribute to the output power, the power factor of the system is reduced. Moreover, the charging of the input capacitor is usually completed when the phase of the input voltage is at 90 degrees, which results in a phase shift between the input AC current and the input AC voltage, further reducing the power factor. For example, conventional power supply systems, such as the system shown in FIG. 1, typically have a power factor of about 0.4.

In FIG. 2, Icin is the discharge waveform of capacitor Cin. During a period of AC input voltage Vac, most of the time, capacitor Cin supplies power to the primary winding. Input Vac charges capacitor Cin only through rectifier bridge 20 only when Vac is higher than the voltage at Cin. The waveform of input AC current is shown as Iac in FIG. 2. When the effective input AC voltage is high, the conduction time of rectifier bridge 20 is short. As a result, the peak current of Iac is high, and Iac has more higher-order harmonics, leading to low system power factor. As an example, a specific measurement of the SMPS of FIG. 1 shows that when the input AC voltage has an effective value of 265 V, the power factor is only about 0.4. These systems likely will not meet the requirement of new energy requirement standards. For example, a U.S. standard requires LED lamps with power rating higher than 5 W to have a power factor no lower than 0.7. An European standard requires LED lamps with power rating higher than 25 W to have a power factor higher than 0.9. Taken into consideration of the realistic application, the power factor requirement is likely to be higher than listed in the standards. Therefore, there is an urgent need to improve the power factor of power supplies for applications such as LED drivers.

According to embodiments of the invention, a control circuit for the SMPS is configured to perform the following:
when the AC input voltage is near a zero crossing, allow the input capacitor to discharge to provide power to the load; and
when the input AC voltage is near a peak or a valley of its waveform, prevent the input capacitor from discharging, wherein the input AC voltage provides power to the load through a rectifying circuit.

The control circuit enables the SMPS to thereby provide sufficient power during a greater portion of the AC input voltage cycle, allowing the rectifier device to have a large conduction angle to increase a power factor (PF) of the SMPS.

Figure 3:
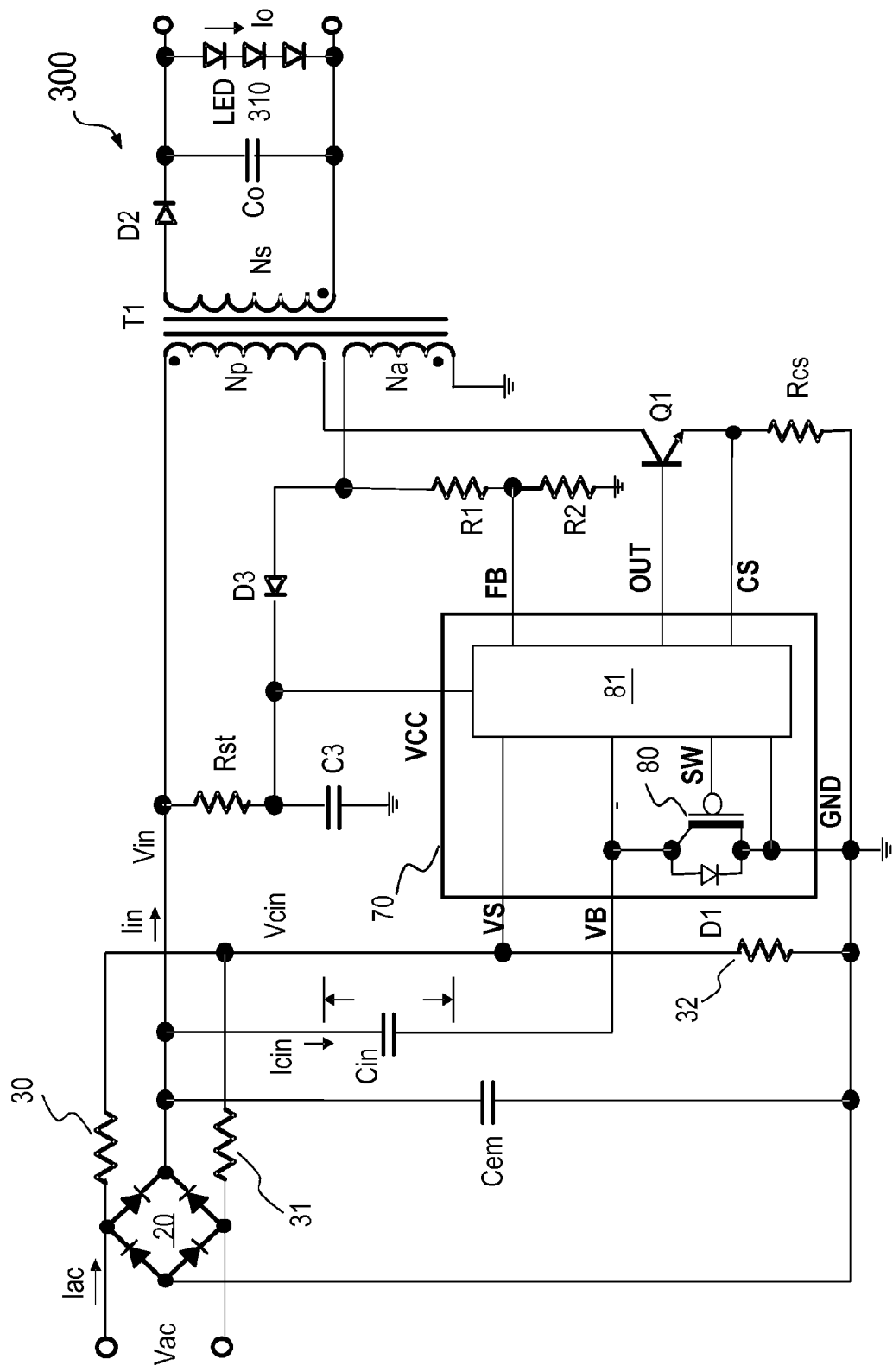
FIG. 3 is a schematic diagram illustrating an LED driver system 300 according to an embodiment of the present invention.
Figure 4:
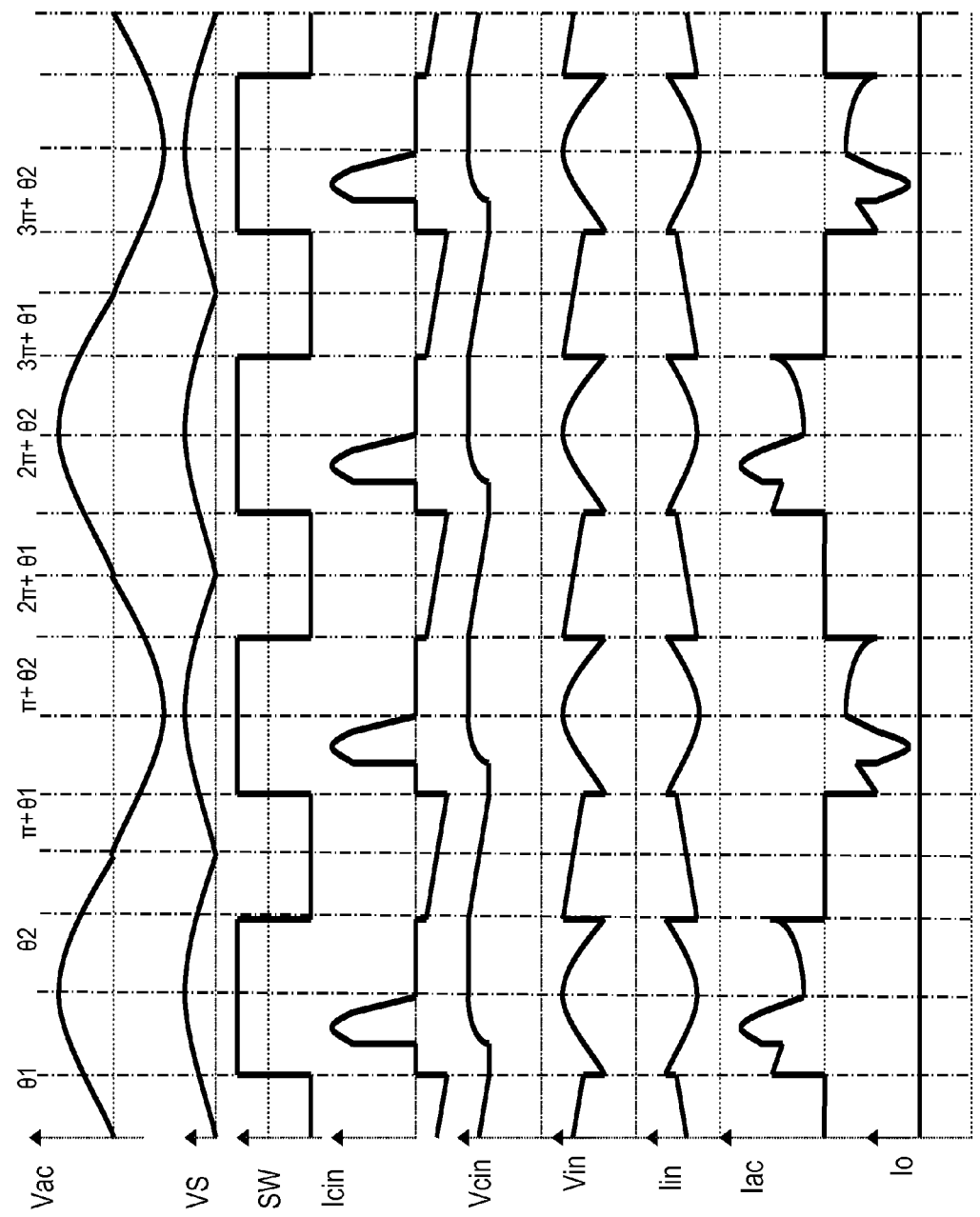
FIG. 4 is a waveform diagram illustrating various signals in the power supply system of FIG. 3.

FIG. 3 is a schematic diagram illustrating an LED driver system 300 according to an embodiment of the present invention. FIG. 4 is a waveform diagram illustrating various signals in the power supply system of FIG. 3. Description of LED driver system 300 is provided below with reference to the signals shown in FIG. 4. LED driver system 300 includes an SMPS providing an output current Io to an LED string 310. The SMPS includes a rectifying circuit 20, a transformer T1, an input capacitor Cin, a first power switch 80, a second power switch Q1, and a controller 70. Transformer T1 includes a primary winding having a coil count Np, a secondary winding having a coil count of Ns, and an auxiliary winding having a coil count of Na. An input AC voltage Vac passes through rectifier bridge 20 and charges input capacitor Cin, producing a rectified DC (direct current) input voltage Vin. Input capacitor Cin is coupled to input pin VB of controller 70. Controller 70 includes a control circuit 81 and first power switch 80 which is used for controlling the operation of input capacitor Cin. In some embodiments, control circuit 81 and power switch 80 reside in the same single integrated circuit chip. In some other embodiments, control circuit 81 and power switch 80 reside in separate integrated circuit chips.

As shown in FIG. 3, controller 70 includes a first input terminal VS for determining the phase and/or amplitude of the input AC voltage, a second input terminal CS for sensing the primary current of the transformer, and a third input terminal FB for determining the voltage of the auxiliary winding. Controller 70 also includes a first control terminal VB for controlling the operation of input capacitor Cin and a second control terminal OUT for controlling the second power switch Q1 to maintain the SMPS output at a constant current or a constant voltage.

Controller 70 determines the amplitude and phase of input AC signal through rectifying circuit 20 and an AC voltage detection resistive circuit (including first resistor 30, second resistor 31, and third resistor 32). Control circuit 81 is also configured to detect the voltage VBS at the bottom plate of capacitor Cin and to generate control signal SW for controlling first power switch 80. When switch 80 is turned on, input capacitor Cin can provide power to the primary winding of the transformer. When switch 80 is off, the input AC voltage, through rectifying circuit 20, provides power to the primary winding of the transformer. If the rectified voltage Vin is higher than the voltage at the top plate of capacitor Cin, Vin can charges Cin to replenish the charges lost during its discharge. Thus, through switch 80, the system is configured to control the conduction and cutoff time according to the requirement of system power factor. In some embodiments, system 300 also includes other components, such as capacitor Cem, which is used for reducing system electromagnetic interference and has a capacitance on the order of nanofarads. Diode D1 is used to prevent input capacitor Cin from discharging into Cem, which can cause loss of efficiency.

In some embodiments, the control circuit is configured to turn on the first power switch when the AC input voltage is near a zero crossing to cause the input capacitor to discharge to the primary winding, and turn off the first power switch to prevent the input capacitor from discharging when the input AC voltage is near a peak or a valley of its waveform. In a specific embodiment, the control circuit is configured to turn on the first power switch when an absolute magnitude of the AC input voltage is less than a reference voltage to cause the input capacitor to discharge to the primary winding, and turn off the first power switch when the absolute magnitude of the AC input voltage is greater than the reference voltage to prevent the input capacitor from discharging.

In some embodiments, the first power switch 80 includes a PMOS transistor with a source coupled to the primary side ground GND and a drain coupled to the input capacitor Cin at terminal VB. The PMOS transistor further includes a parasitic PN diode that provides a path for charging the input capacitor. The first power switch 80 is configured to discharge the input capacitor when the voltage between the gate and source of the PMOS transistor is smaller than its threshold voltage, and the first power switch is configured to prevent discharging the input capacitor when the voltage between the gate and source of the PMOS transistor is greater than its threshold voltage. In alternative embodiments, the first power switch 80 includes a PNP transistor having an emitter coupled to ground, a collector coupled to the input capacitor, and a PN junction between the collector and emitter that provides a charging path.

As shown in FIG. 3, the system also includes a second power switch Q1 coupled to the primary winding. Control circuit 81 is also configured to control the on and off of the second power switch Q1 based on a feedback signal FB to maintain the output of the SMPS at a constant voltage or a constant current. In some embodiments, the second power switch Q1 includes a high-voltage bipolar transistor or a high-voltage metal-oxide-semiconductor field effect transistor (MOSFET). Depending on the embodiment, the second power switch and the control circuit can reside in two separate packaged devices. Alternatively, the second power switch and the control circuit can reside in a single packaged device.

In FIG. 4, when the input AC voltage Vac=A*sin(θ) is near the zero crossing (between phase angles near 0 and 180), signal SW is low, and capacitor Cin is discharging. This enables the voltage Vin from rectifier circuit 20 to maintain enough magnitude for providing energy to the secondary side of the transformer to prevent low-frequency ripples caused by low Vin. When the input AC voltage is near a peak or valley of its wave form (with phase angle close to 90 or 270), input capacitor Cin is charging, to compensate for the energy released near the zero crossing of the waveform. This operation tends to reduce the phase angle between the input AC voltage and input AC current Iac (which includes input capacitor charging current Icin and primary current Iin) and thereby improves the power factor.

In some embodiments, based on the requirement of system power factor, when the phase angle of the input AC voltage is between $n*\pi+\theta1$ and $n*\pi+\theta2$, the first switch 80 is turned off, preventing input capacitor Cin from discharging. As a result, rectified input voltage Vin directly provides power to the primary winding of the transformer. When Vin is higher than the voltage across Cin, Vcin, Vin charges capacitor Cin. The peak charging current depends on the capacitance of Cin, the rate of change of Vin, and the effective series resistance in the Cin charging circuit.

When the voltage of Cin reaches the maximum Vin, charging of Cin stops, and the voltage between the top and bottom plates of Cin stays at Vcin until first power switch 80 is turned on. After first power switch is turned on, the voltage between the top and bottom plates of Cin becomes greater than the previous Vin. At this time, Cin provides power to the primary winding of the transformer, and the voltage between the top and bottom plates of Cin gradually decreases.

In FIG. 4, Iac is the waveform of input AC current. When the phase angle of the input AC voltage is between $n*\pi$ and $n*\pi+\theta_1$ and between $n*\pi+\theta_2$ to $(n+1)*\pi$, capacitor Cin provides power to the primary winding of the transformer, and Iac is zero. When the phase angle of the input AC voltage is between $n*\pi+\theta_1$ and $n*\pi+\theta_2$, rectified input voltage Vin directly provides power to the primary winding of the transformer. When Vin is higher than the voltage across Cin, Vcin, Vin charges capacitor Cin. The peak current of Iac is the peak charging current from Vin to Cin. By controlling the turn-on and turn-off timing of switch 80 and selecting appropriate capacitance of Cin, embodiments of the invention can satisfy the requirement of power factor being greater than 0.7 and removing the 100 Hz or 120 Hz low frequency ripples from output current Io.

Figure 5:
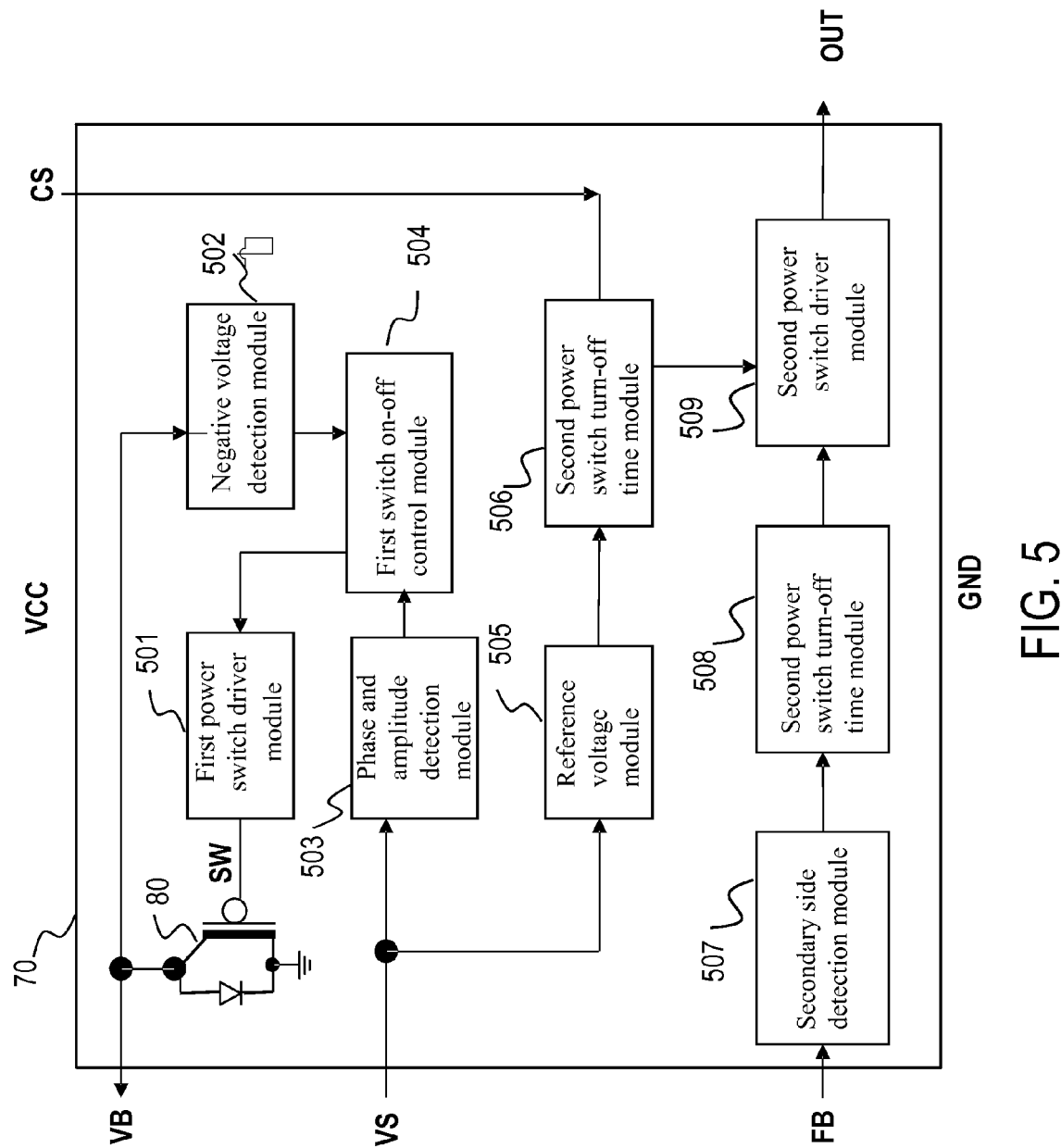
FIG. 5 is a simplified block diagram illustrating an SMPS controller 70 according to an embodiment of the present invention.

FIG. 5 is a simplified block diagram illustrating an SMPS controller 70 in FIG. 3 according to an embodiment of the present invention. As shown in FIG. 5, controller 70 includes first power switch 80, a first power switch driver module 501, a negative capacitor voltage detection module 502, a phase and amplitude detection module 503, and a first switch on-off control module 504. First switch on-off control module 504 controls input capacitor Cin based on ses the output of phase and amplitude detection module 503 and the voltage signal VB at the bottom plate of capacitor Cin. As described in more detail in FIG. 6, modules 501, 502, 503, and 504 are configured to control power switch 80.

In FIG. 5, the controller also includes modules 505 to 509, which are configured to control power switch Q1 for controlling primary current in the transformer. Reference voltage module 505 is configured to provide a reference voltage (the third reference voltage). Depending on the embodiment, this reference voltage can be a constant voltage or an AC reference voltage having the same phase angle as the input AC voltage. Module 506 is configured to control the turn-off time of the second power switch, which controls the current flow in the primary winding. Module 506 is coupled to reference voltage module 505 and input pin CS. When the voltage at CS reaches the reference voltage, second power switch is turned off to stop the flow of primary current. Secondary side detection module 507 is configured to receive a feedback signal FB from a third pin FB and provide a signal reflecting the condition of the rectifier circuit on the secondary side. Module 508 is configured to control the turn-on time for the second power switch. The turn-on time is determined by comparing a voltage at a capacitor with a reference voltage. The capacitor is charged and discharged using a first and a second current sources depending on whether the secondary side conducting or turned off. Module 509 is a driver circuit for the second power switch. Module 509 is configured to turn on or turn off the second power switch based on the signals from modules 506 and 508.

In some embodiments, when the ratio between secondary side rectifier on time and off time is constant, then the output current Io of the SMPS can be expressed as, $$Io=0.5*(Vcs/Rcs)*(Np/Ns)*k$$

where Vcs is the voltage at the second terminal CS when the second power switch Q1 turns off, Rcs is the resistance of current sense resistor for the primary current, Np is the turn number of the primary coil, Ns is the turn number of the secondary coil, and k is the ratio of the rectifier on time to the period of the second power switch.

Figure 6:
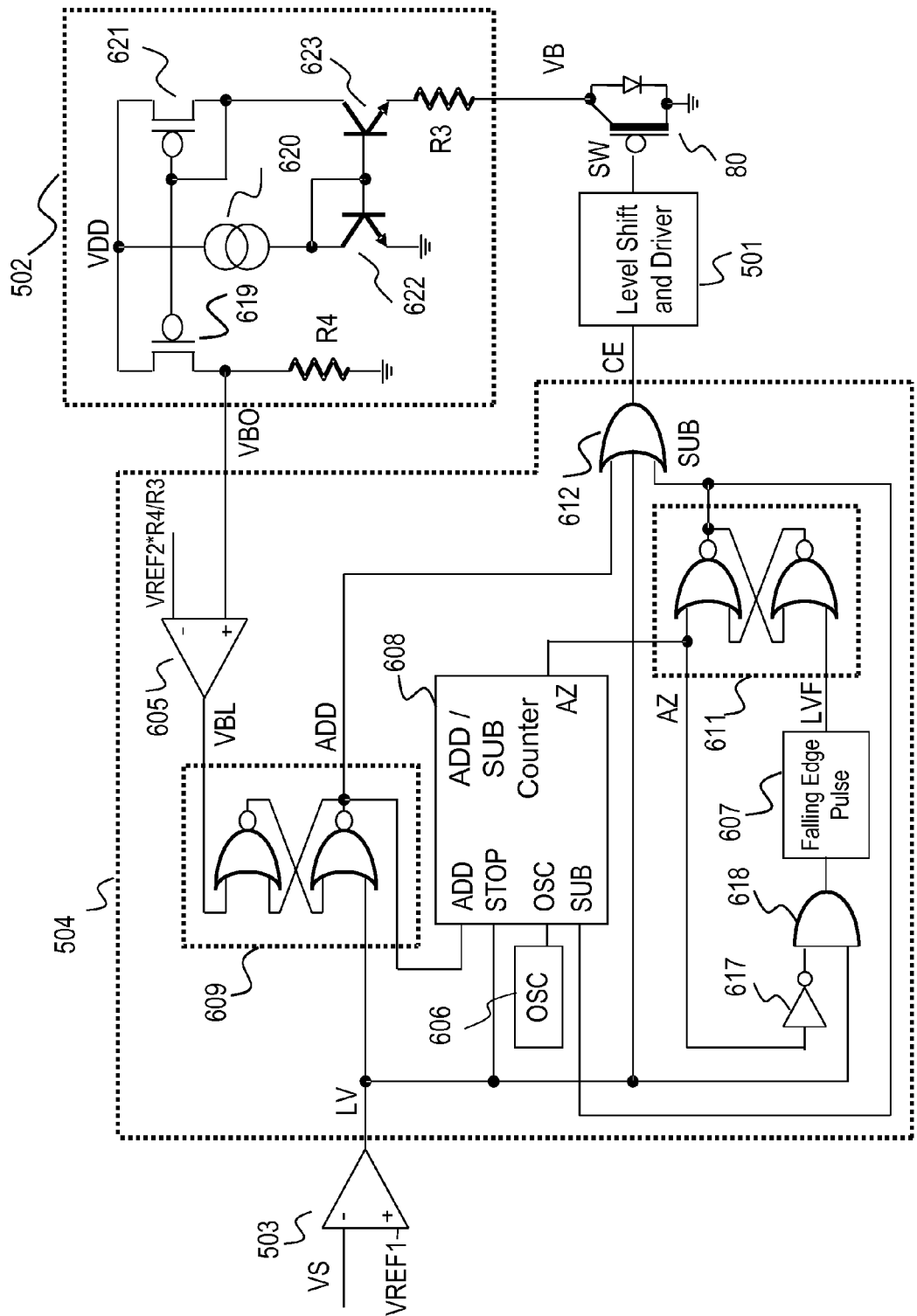
FIG. 6 is a schematic diagram illustrating a control circuit for the input capacitor according to an embodiment of the invention.
Figure 7:
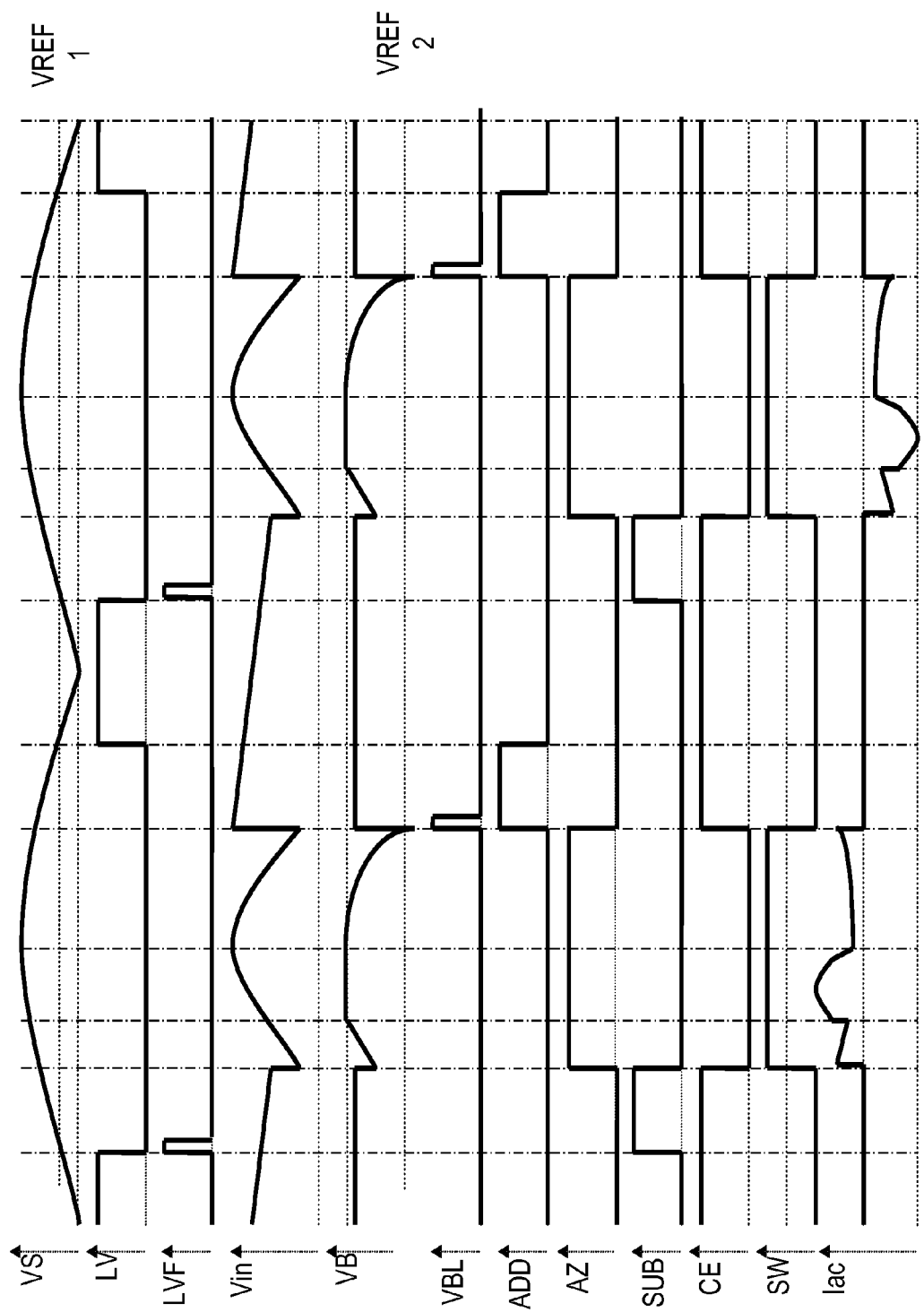
FIG. 7 is a waveform diagram illustrating various signals in circuit of FIG. 6.

FIG. 6 is a schematic diagram illustrating a control circuit for the input capacitor according to an embodiment of the invention. FIG. 7 is a waveform diagram illustrating various signals in circuit of FIG. 6. FIG. 6 provides a circuit implementation of modules 501 to 504 of FIG. 5, which is briefly described above. A more detailed description of the operations of modules 501 to 504 is provided below with reference to the signals shown in FIG. 7. The control circuit in FIG. 6 includes first power switch 80, first power switch driver module 501, capacitor negative voltage detection module 502, phase and amplitude detection module 503, and first switch on-off control module 504. Module 502 is configured to detect the voltage VB at the lower terminal of capacitor Cin. Phase and amplitude detection module 503 is configured to detect the AC voltage at terminal VS. In this embodiment, the phase and amplitude detect on module includes a comparator 503. When VS is lower than a first reference voltage VREF1, the output of comparator 503, LV, is high. LV is connected to OR gate 612, which causes power switch 80 to turn on when LV is high.

First switch on-off control module 504 receives outputs from capacitor voltage detection module 502, phase and amplitude detection module 503 and provides control signal CE. First power switch driver module 501 receives control signal CE and provides the driving signal SW to turn on and off first power switch 80. Capacitor voltage detection module 502 includes first NPN transistor 622, second NPN transistor 623, third current source 620, first PMOS transistor 619, second PMOS transistor 621, and resistors R3 and R4. Transistors 622 and 623 form a current mirror configured to maintain the emitter of transistor 623 at a near zero voltage (a virtual ground) when voltage VB is negative. When VB is greater than zero, the output of module 502 VBO is 0 V. When voltage VB is less than zero, the current through the third resistor R3 is $|V_{VB}|/R3$, and the voltage at VBO is $|V_{VB}|*R4/R3$.

AS shown in FIG. 6, the output of comparator 605 is high when VBO is higher than $|VREF2|*R4/R3$, which occurs when the negative voltage of VB is less than a second reference voltage VERF2. Under this condition, the output ADD of RS trigger 609 is high, and OR gate 612 keeps switch 80 on when ADD is high. Add-Subtract counter 608 starts to count up from the all-zero condition (with output AZ=1), and AZ becomes 0. Counter 608 continues to count up until the LV signal becomes high, at which point, the counting stops and counter 608 maintains its state. When counter 608 is not in the all-zero condition (AZ=0), at the falling edge of the LV signal, the circuit including 617, 618, and 607 produce a high pulse signal (LVF) that causes the output SUB of RS trigger 611 to be high. Under this condition, the high SUB signal feeds into OR gate 612 to turn on switch 80. At this point, counter 608 starts to count down from the non-all-zero condition (AZ=0). When counter 608 reaches the all zero condition, AZ becomes 1, and SUB becomes low, the countdown stops. Under this condition, AZ=1, CE=0, and switch 80 is turned off. Capacitor Cin is not allowed to discharge to the primary winding of the transformer.

Figure 8:
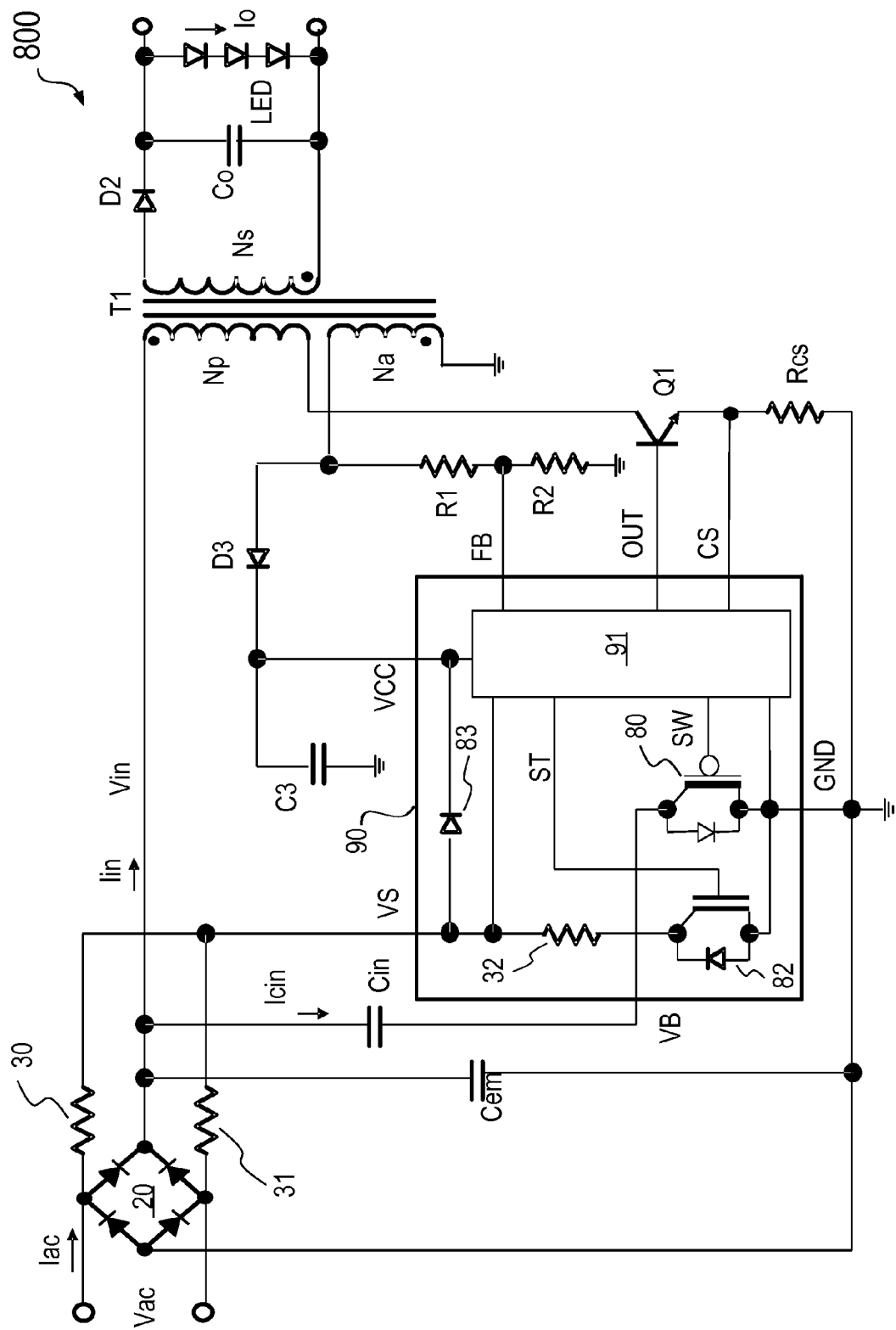
FIG. 8 is a schematic diagram illustrating an LED driver system 800 including an SMPS according to another embodiment of the present invention.

FIG. 8 is a schematic diagram illustrating an LED driver system 800 including an SMPS according to another embodiment of the present invention. The system of FIG. 8 has many similar components as the system of FIG. 3, for example, controller 90, control circuit 91, first power switch 80, second power switch Q1, and control signal SW. However, beside the first power switch 80, system 800 also includes another switch 82 and a diode 83, but without resistor Rst between Vin and VCC. Further, control circuit 91 provides a control signal ST. When the SMPS starts up, control signal ST=0, and switch 82 is off. Vin charges up VCC capacitor C3 through resistors 30 and 31. When the voltage at C3 reaches a startup voltage of controller 90, ST=1, switch 82 is turned on. The phase or amplitude of input AC voltage is sampled at VS through resistors 30, 31, and 32.

The above description is intended to be illustrative and not restrictive. Many variations of the invention will become apparent to those skilled in the art upon review of this disclosure. The scope of the invention should, therefore, not be limited the above description.

What is claimed is:

1. A switch mode power supply (SMPS) system, comprising:
   a rectifying device configured for converting a periodically varying input AC (alternating current) voltage into a DC (direct current) voltage;
   a transformer including a primary winding, a secondary winding, and an auxiliary winding, the primary winding being coupled to the rectifying device;
   an input capacitor having a first terminal and a second terminal, the first terminal coupled to the rectifying device and the primary winding of the transformer;
   a first power switch coupled to the second terminal of the input capacitor and a primary side ground; and
   a control circuit coupled to the first power switch and the input AC voltage, the control circuit being configured to control the first power switch based on a phase or amplitude of the input AC voltage, wherein the control circuit is configured to:
   turn on the first power switch when the AC input voltage is near a zero crossing of its waveform to cause the input capacitor to discharge to the primary winding; and
   turn off the first power switch to prevent the input capacitor from discharging when the input AC voltage is near a peak or a valley of its waveform;
   whereby power is provided to the primary winding during a longer portion of the AC input voltage cycle, allowing the rectifier device to have a larger conduction angle to increase a power factor (PF).

2. The SMPS system as recited in claim 1, wherein the control circuit is configured to:
   turn on the first power switch when an absolute magnitude of the AC input voltage is less than a reference voltage to cause the input capacitor to discharge to the primary winding; and
   turn off the first switch when the absolute magnitude of the AC input voltage is greater than the reference voltage to prevent the input capacitor from discharging.

3. The SMPS system as recited in claim 1, wherein the first power switch comprises a diode coupled between the input capacitor and the primary side ground, whereby the diode is configured to provide a path for charging current.

4. The SMPS system as recited in claim 1, further comprising first, second, and third resistors, wherein the first and the second resistors are coupled in series between two terminals of the input AC voltage, the third resistor couples a common node between the first and second resistors to a primary side ground, and the common node is coupled to a first input terminal of the controller for determining the phase and amplitude of the input AC voltage.

5. The SMPS system as recited in claim 1, further comprising a second capacitor between the output of the rectifying circuit and the primary ground for suppressing electromagnetic interference, the second capacitor being coupled to the input capacitor through a second diode that prevents the input capacitor from discharging into the second capacitor.

6. The SMPS system as recited in claim 1, further comprising a second power switch coupled between the primary winding and the control circuit, the control circuit being configured to control the on and off of the second power switch to maintain the output of the SMPS at a constant voltage or a constant current.

7. A controller for a switch mode power supply (SMPS) system, the SMPS system including:
   a rectifying device, configured for converting a periodically varying input AC voltage into a single polarity DC voltage;
   a transformer including a primary winding, a secondary winding, and an auxiliary winding, the primary winding being coupled to the rectifying device; and
   an input capacitor having a first terminal and a second terminal, the first terminal coupled to the rectifying device and the primary winding of the transformer;
   wherein the controller comprises:
   a first power switch for coupling to the second terminal of the input capacitor and a ground of the controller;
   a detection circuit for coupling to the input AC voltage and the ground of the controller, the detection circuit configured for determining an amplitude or a phase of the input AC voltage; and
   a control circuit coupled to the first power switch and configured to turn on and turn off the first power switch based on the amplitude or phase of the input AC voltage.

8. The controller as recited in claim 7, wherein the control circuit is configured to:
   turn on the first power switch when the AC input voltage is near a zero crossing to cause the input capacitor to discharge to the primary winding; and
   turn off the first power switch to prevent the input capacitor from discharging when the input AC voltage is near a peak or a valley of its waveform.

9. The controller as recited in claim 7, wherein the control circuit is configured to:
   turn on the first power switch when an absolute magnitude of the AC input voltage is less than a reference voltage to cause the input capacitor to discharge to the primary winding; and
   turn off the first power switch when the absolute magnitude of the AC input voltage is greater than the reference voltage to prevent the input capacitor from discharging.

10. The controller as recited in claim 7, wherein the first power switch comprises a PMOS transistor with a source coupled to the primary side ground and a drain coupled to the input capacitor, the PMOS transistor further including a parasitic PN diode that provides a path for charging the input capacitor, wherein the first power switch is configured to discharge the input capacitor when the voltage between the gate and source of the PMOS transistor is smaller than its threshold voltage, and the first power switch is configured to prevent discharging the input capacitor when the voltage between the gate and source of the PMOS transistor is greater than its threshold voltage.

11. The controller as recited in claim 10, wherein the controller is configured to control the discharge of the input capacitor based on the phase or amplitude of the input AC current such that the input capacitor provides power to the primary winding near the zero crossing of the AC current to provide a constant current or constant voltage, wherein the controller is configured to prevent the input capacitor from discharging when the input AC current is near a peak or valley of its waveform to provide a large conduction angle in the rectifying circuit to improve the power factor.

12. The controller as recited in claim 10, wherein the PMOS power switch and the control circuit reside in two separate packaged devices.

13. The controller as recited in claim 10, wherein the PMOS power switch and the control circuit reside in a single packaged device.

14. The controller as recited in claim 7, wherein the first power switch comprises a PNP transistor having an emitter coupled to ground, a collector coupled to the input capacitor, and a PN junction between the collector and emitter that provides a charging path.

15. The controller as recited in claim 7, further comprising a second power switch coupled to the primary winding, wherein the control circuit is configured to control the on and off of the second power switch based on a feedback signal to maintain the output of the SMPS at a constant voltage or a constant current.

16. The controller as recited in claim 15, wherein the second power switch comprises a high-voltage bipolar transistor or a high-voltage metal-oxide-semiconductor field effect transistor (MOSFET), the second power switch and the control circuit residing in two separate packaged devices.

17. The controller as recited in claim 15, wherein the second power switch comprises a high-voltage bipolar transistor or a high-voltage metal-oxide-semiconductor field effect transistor (MOSFET), the second power switch and the control circuit residing in a single packaged device.

18. A method for increasing a power factor in a switch mode power supply (SMPS) system, the SMPS system including:
   a rectifying device, configured for converting a periodically varying input AC voltage into a single polarity DC voltage;
   a transformer including a primary winding, a secondary winding, and an auxiliary winding, the primary winding being coupled to the rectifying device; and
   an input capacitor having a first terminal and a second terminal, the first terminal coupled to the rectifying device and the primary winding of the transformer;
   wherein the method comprises:
   coupling a first power switch between the second terminal of the input capacitor and a ground;
   determining an amplitude or a phase of the input AC voltage; and
   turning on or turning off the first power switch based on the amplitude or phase of the input AC voltage.

19. The method as recited in claim 18, wherein turning on and turning off the first power switch comprises:

turning on the first power switch when the AC input voltage is near a zero crossing to cause the input capacitor to discharge to the primary winding; and turning off the first power switch to prevent the input capacitor from discharging when the input AC voltage is near a peak or a valley of its waveform.

20. The method as recited in claim 18, wherein turning on and turning off the first power switch comprises:

turning on the first power switch when an absolute magnitude of the AC input voltage is less than a reference voltage to cause the input capacitor to discharge to the primary winding; and turning off the first switch when the absolute magnitude of the AC input voltage is greater than the reference voltage to prevent the input capacitor from discharging.

* * * * *